United States Patent
Berthe (10) Patent No.: US 7,234,637 B2
(45) Date of Patent: Jun. 26, 2007

(54) HIGH-SPEED PERSONALIZATION MACHINE

(75) Inventor: Benoit Berthe, La Chapelle Saint Mosmin (FR)

(73) Assignee: DataCard Corporation, Minnetonka, MN (US)

( * ) Notice: Subject to any disclaimer, the term of this patent is extended or adjusted under 35 U.S.C. 154(b) by 96 days.

(21) Appl. No.: 10/958,664

(22) Filed: Oct. 6, 2004

(65) Prior Publication Data
US 2005/0218212 A1    Oct. 6, 2005

(30) Foreign Application Priority Data
Apr. 6, 2004    (FR) .................................. 04 03623

(51) Int. Cl.
*G06K 7/00*    (2006.01)
(52) U.S. Cl. ....................................... 235/380; 235/492
(58) Field of Classification Search ................ 235/381, 235/380, 487, 492, 462.01, 382, 385
See application file for complete search history.

(56) References Cited

U.S. PATENT DOCUMENTS 6,146,777 A  *  11/2000  Waller ........................ 428/507

FOREIGN PATENT DOCUMENTS

| EP | 364730 | * | 4/1990 |
| EP | 0 706 150 | | 4/1996 |
| WO | 02089052 | * | 7/2002 |

* cited by examiner

Primary Examiner—Daniel Stcyr
(74) Attorney, Agent, or Firm—Nixon & Vanderhye P.C.

(57) ABSTRACT

The present invention concerns a high-speed personalization machine comprising a personalization station for personalizable documents and a computer system, the machine being characterized in that a personalizable document comprises information, whether visible or not corresponding to an identification, an electronic chip and contactless communication means of transmitting/receiving antenna type connected to the electronic chip, the electronic chip and the communication means being incorporated in the document, and in that the personalization machine comprises a reading device to read the document identifier, this identifier being associated with data memorized in a database of the computer system, at least some of this data to be recorded by the personalization machine into the electronic chip of the document.

35 Claims, 8 Drawing Sheets

HIGH-SPEED PERSONALIZATION MACHINE

BACKGROUND

1. Technical Field

The present invention relates to a high-speed personalization machine, more particularly a personalization machine for documents, such as passports, containing an electronic chip.

2. Related Art

Personalization machines are known for portable items such as chip cards and in particular so-called "smart" cards, i.e. which incorporate a microprocessor or microcomputer. With these machines it is possible to record information derived from a computer system into the memory of a card microprocessor, the chip card before personalization being blank without any marking and not being pre-selected. After personalization, the machine conducts a follow-up operation of the personalized card to print or mark the card plastic with detector information. These chip cards communicate with the outside world via contact or contactless terminals depending upon applications requiring greater or lesser security. However, these high speed personalization machines do not allow personalization of electronic chips incorporated in an identity document such as a passport, whose personalization information is directly related to masked or printed information already contained in the document. In this case, the personalization machine must conduct an identification operation of the item incorporating the electronic chip before personalization to avoid any writing error of personalization data in an electronic chip not corresponding to the content of the document in which the chip is inserted.

BRIEF SUMMARY

One object of the present invention is to overcome some disadvantages of the prior art, by proposing a high-speed personalization machine for electronic chips integrated in a document carrying information previously marked on the document, such as a passport.

This first objective is achieved with a high-speed personalization machine comprising a device for personalizable documents and a computer system, the machine being characterized in that a personalizable document comprises information whether visible or not corresponding to an identification, an electronic chip and a contactless communication means of transmitting/receiving antenna type connected to the electronic chip, the electronic chip and the communication means being incorporated in the document and the personalization machine comprising a reading device to read the document identifier, this identifier being associated with data memorized in a database of the computer system, at least some of this data being recorded by the personalization machine into the electronic chip of the document.

According to one particularity, the electronic chip comprises an integrated circuit containing at least one memory.

According to one particularity, the document identifier is a printed data item of bar code, punched or magnetic type or a sequence of OCR or OCV characters.

According to one particularity, the document identifier is a pre-memorized data in the document's electronic chip, such as the serial number of the electronic chip.

According to one particularity, the document is a document of passport type comprising several pages, the electronic chip and communication means being incorporated together either in the document cover, or between the pages of the document.

According to one particularity, the document is a document of passport type comprising several pages, the identifier being marked on one of the outside or inside surfaces of the document cover or on one of the pages of the document.

According to one particularity, the personalization station comprises a plurality of personalization devices in which the personalization documents are loaded, and one or more electronic cards connected to one or more personalization devices, a personalization device comprising a fixed plate on which the document is held and a contactless communication means such as a transmitting/receiving antenna to communicate with the contactless communication means of the document, the antenna being associated with an electronic card allowing the personalization of each document, the electronic card being in communication with the computer system which manages the personalization data.

According to one particularity, in the high-speed personalization machine the holding of the document in the personalization device is ensured by pinching the document between the fixed plate and a head.

According to one particularity, the contactless communication means of the personalisation device is arranged in the head.

According to one particularity the contactless communication means of the personalization device is arranged in the fixed plate.

According to one particularity, each electronic card comprises an interface circuit with one or more contactless communication means connected via a bus to a microprocessor which executes a personalization programme.

According to one particularity, the computer system is connected to the reading device of the document identifier, the reading device comprising transmission means to transmit the identifier towards the computer system, which is coupled to a database, the computer system comprising means for extracting personalization data from the database and communicating them to the electronic card of the personalization device in which the document is to be inserted, and for sending this data to the electronic card, the electronic card comprising means for transmitting the received personalization data towards the memory of the electronic chip.

According to one particularity, the bus of each electronic card is networked by an interface connected via a connector to the computer system, the computer system comprising a follow-up means to track the position of the electronic cards connected to the personalization devices and for addressing the electronic cards corresponding to the personalization device arriving at the loading position or which has just left the loading position.

According to one particularity, the reading device is an optical character recognition device which can read a visible printed identifier of the document, the computer system using this identifier to search the personalization data in its data base.

According to one particularity, the reading device comprises a page turning element to turn the pages of the document and holding these pages open at the page in which the identifier is recorded.

According to one particularity, the reading device is a magnetic or electromagnetic reading device allowing reading of the magnetic identifier of the document, the computer system using this identifier to search personalization data in its data base.

According to one particularity, the reading device is a printed circuit reading device comprising a contactless communication means allowing to read an identifier which is pre-memorized in the memory of the electronic chip of the document, the computer system using this number to search for personalization data in its data base.

According to one particularity, the reading device of the personalization machine is separate from the personalization station and is arranged before the personalization station.

According to one particularity, each electronic card comprises a connector connected to a contactless communication means of the personalization devices, the reading device to read the pre-memorized identifier in the memory of the document's electronic chip being realised by the contactless communication means associated with the microprocessor of the electronic card comprising the personalizable document.

According to one particularity, an optical or magnetic reading device is arranged in the head of each personalization device so that it is positioned facing a visible identifier of a document, which is loaded in a personalization device.

According to one particularity, the personalization machine comprises sequence command and personalization management means.

According to one particularity, the high-speed personalization machine comprises a transfer device for personalizable documents which comprises a transfer path on which grasping means for documents are mounted, the grasping means being mounted at regular intervals in pairs, the maximum distance between two consecutive grasping means enabling the holding of a document.

According to one particularity, the personalization station comprises a revolving plate comprising a plurality of personalization devices presented in loading position, transversely and sequentially to the transfer path of the transfer device, the revolving plate comprising a loading/unloading device which unloads a personalized document from a personalization device positioned on the loading/unloading device onto the transfer device for documents and loads a new document from the transfer device towards the personalization device, the maximum personalization time corresponding to one turn of the revolving plate.

According to one particularity, the personalization station comprises an elevator including a plurality of personalization devices arranged linear and juxtaposed fashion in the elevator, the elevator comprising a loading/unloading device which unloads a personalized document from a personalization device positioned on the loading/unloading device onto the transfer device for documents and loads a new document from the transfer device onto the personalization device, the maximum personalization time corresponding to a complete translation cycle of the elevator.

According to one particularity, the axis of the elevator is arranged perpendicular to and facing the transfer path of the transfer device, the movement of the elevator being made by vertical translation.

According to one particularity, the axis of the elevator is arranged parallel to and facing the transfer path of the transfer device, the movement of the elevator being made by horizontal translation.

According to one particularity, the high-speed personalization machine comprises a document unstacking device at the input of the machine and a stacking device at the output of the machine.

According to one particularity, the high-speed personalization machine can be incorporated in a passport fabrication and/or pre-personalization machine, the computer system of the personalization machine also managing the fabrication and/or pre-personalization of passports.

A further object of the invention consists of a personalization process conducted by a personalization machine comprising a personalization device for a personalizable document and a computer system comprising a database, the personalizable document comprising an identifier, an electronic chip and a contactless communication means, the personalization process being characterized in that it comprises the following steps:

a first reading and transmission step to read the document identifier with a reading device and to transmit the read information to the computer system, a second search step to search personalization data in a database of the computer system in relation to the document identifier, a third data transmission and recording step to transmit and record the data into a memory of the document electronic chip, with optional recording of the identifier in the chip memory.

According to one particularity, the third step is made by a loading step to load personalization data relative to the document identifier into a memory of the electronic card associated with the document-holder device, and a communication step to communicate this personalization data to the electronic chip of the document via contactless communication means to record this data into the memory of the electronic chip.

BRIEF DESCRIPTION OF THE DRAWINGS

Other particularities and advantages of the present invention will be more readily understood by reading the following description made with reference to the appended drawings, in which.

DETAILED DESCRIPTION OF THE EXEMPLARY EMBODIMENTS

Figure 5:
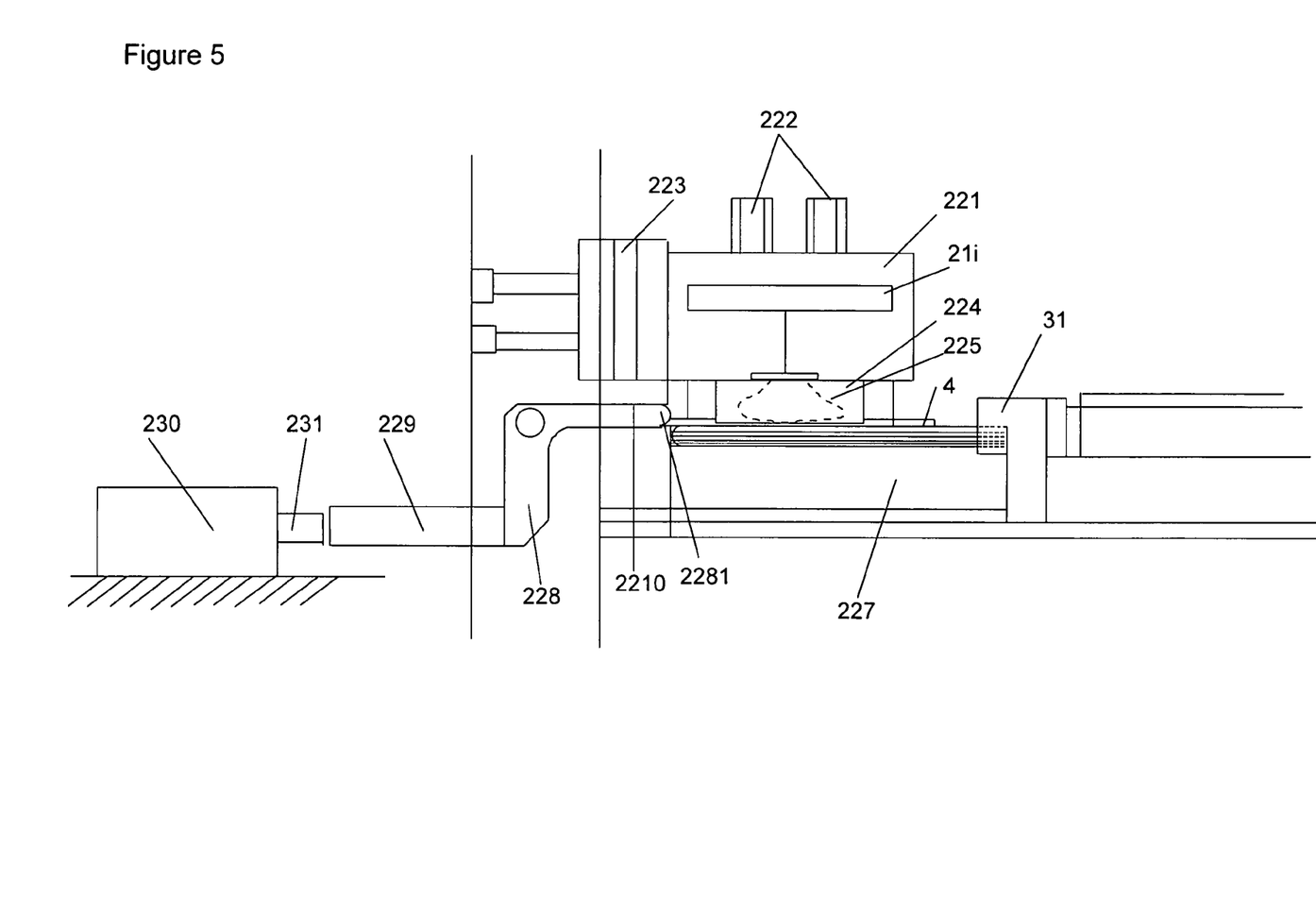
FIG. 5 shows a profile view of the personalization plate associated with a lever system according to one embodiment of the present invention.
Figure 6A:
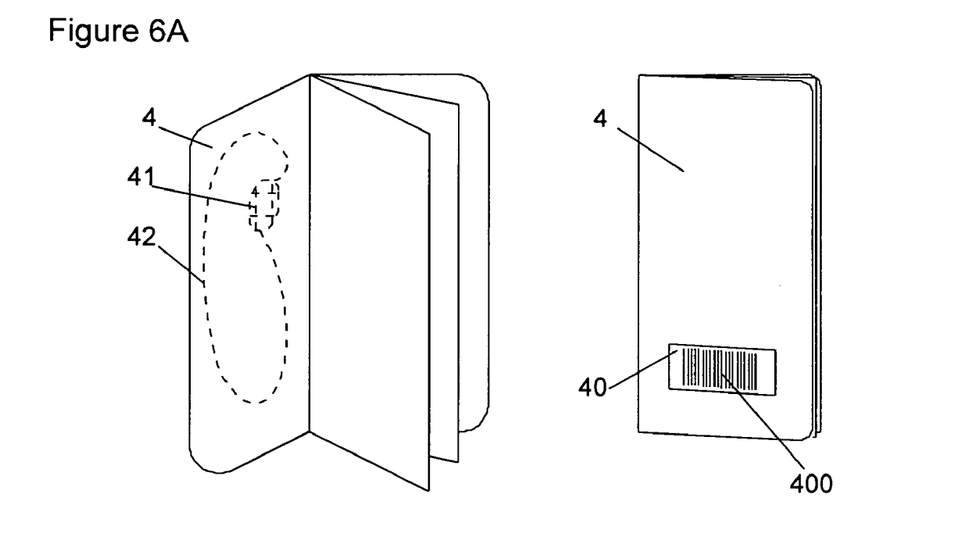
FIGS. 6A and 6B show overhead and inside views of a document according to two embodiments of the present invention.
Figure 6B:
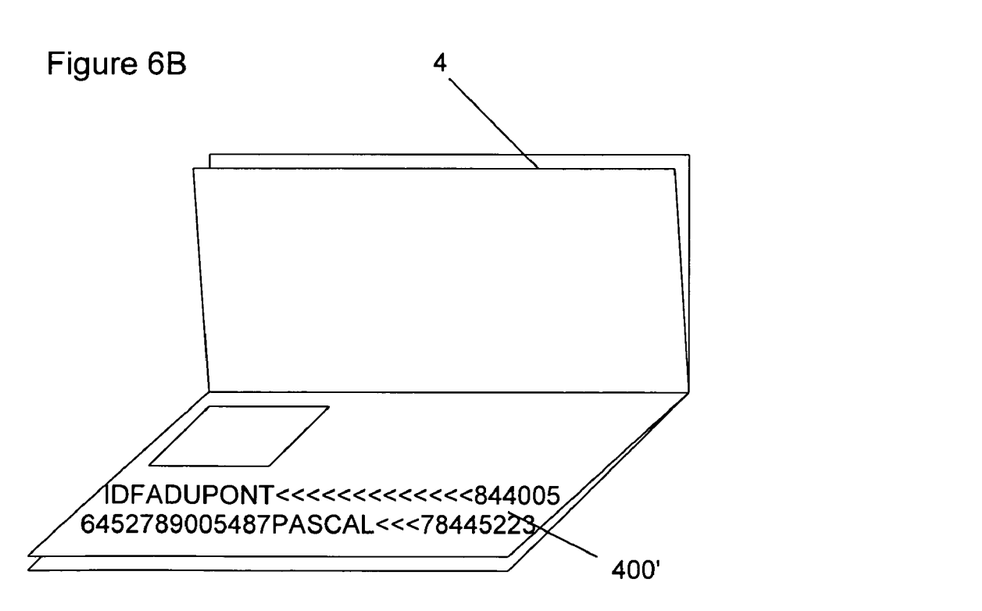

The invention, which will now be described in connection with FIGS. 1 to 7, allows personalization of portable items 4 such as documents hereinafter called passports, each one comprising an electronic chip 41, a contactless communication means 42, such as a transmitting/receiving antenna, associated with the electronic chip, and data whether visible or not, for example a label 40 corresponding to an identification. The label to be identified may be arranged on the outer surface (FIG. 6A) or inner surface of the cover of the document 4, or may also be arranged on one of the pages of the document (FIG. 6B). The identifier of the label 40 may be a bar code, a punch, a redundancy, a code formed of OCR or OCV type characters printed on or in the document, or a magnetic element representing an identification number related to the passport 4. The electronic chip 41 and communication means 42 is inserted together either in the cover of the passport 4 or between several pages of the passport. The electronic chip comprises a memory which may be either totally blank or be previously pre-personalized upstream on a preceding machine and already contain pre-personalization data such as a serial number for example. This pre-personalization data may be considered as the passport identification data, the label not being present on the document in this case. After personalizing the chip on the personalization machine of the invention, the chip memory contains personalization data relative to the information indicated in the passport. For example, this information may be the date of validity and the place of issuance of the passport, information on the passport user such as the date and place of birth of the user, his/her biometric data. Evidently, the present invention allows the personalization of any other document 4 comprising an identifier 40 and an electronic chip 41 such as previously described. The personalization is made with passports 4 comprising electronic chips 41 with so-called "integrated circuit" 41, whose integrated circuit is connected to the outside world via a transmitting/receiving antenna. In this case, the chip is so-called "contactless" and communicates via hertz waves with another antenna connected to the personalization machine. Therefore, the personalization machine, through use of the antenna, may personalize without contact electronic chips 41 of passports 4.

Figure 1:
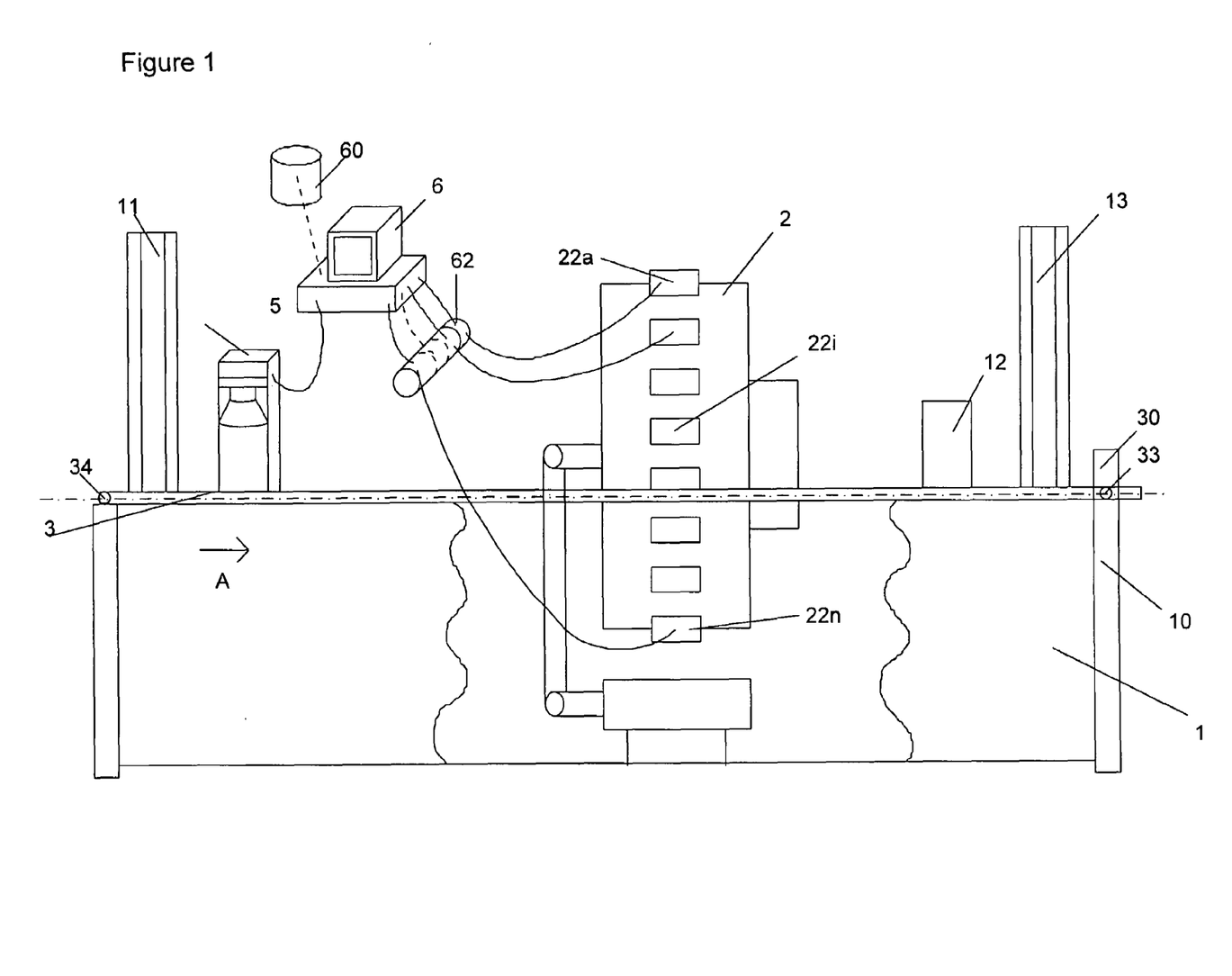
FIG. 1 shows a front elevation view of the personalization machine according to a first embodiment of the present invention.

With reference to FIG. 1, the invention chiefly comprises a reading device 5 to read the passport identifier and a personalization device 2 for the chip inserted in this same passport, the reading device 5 and the personalization device 2 both being connected to a computer system comprising a database in which the personalization data is stored. The information read by the reading device 5 enables the computer system to recover personalization data relative to the information in the database and to transmit them to the personalization device, which will communicate this personalization data into the memory of the electronic chip inserted in the passport. Several embodiments are presented below describing a personalization machine comprising at least the technical characteristics just described.

Figure 3:
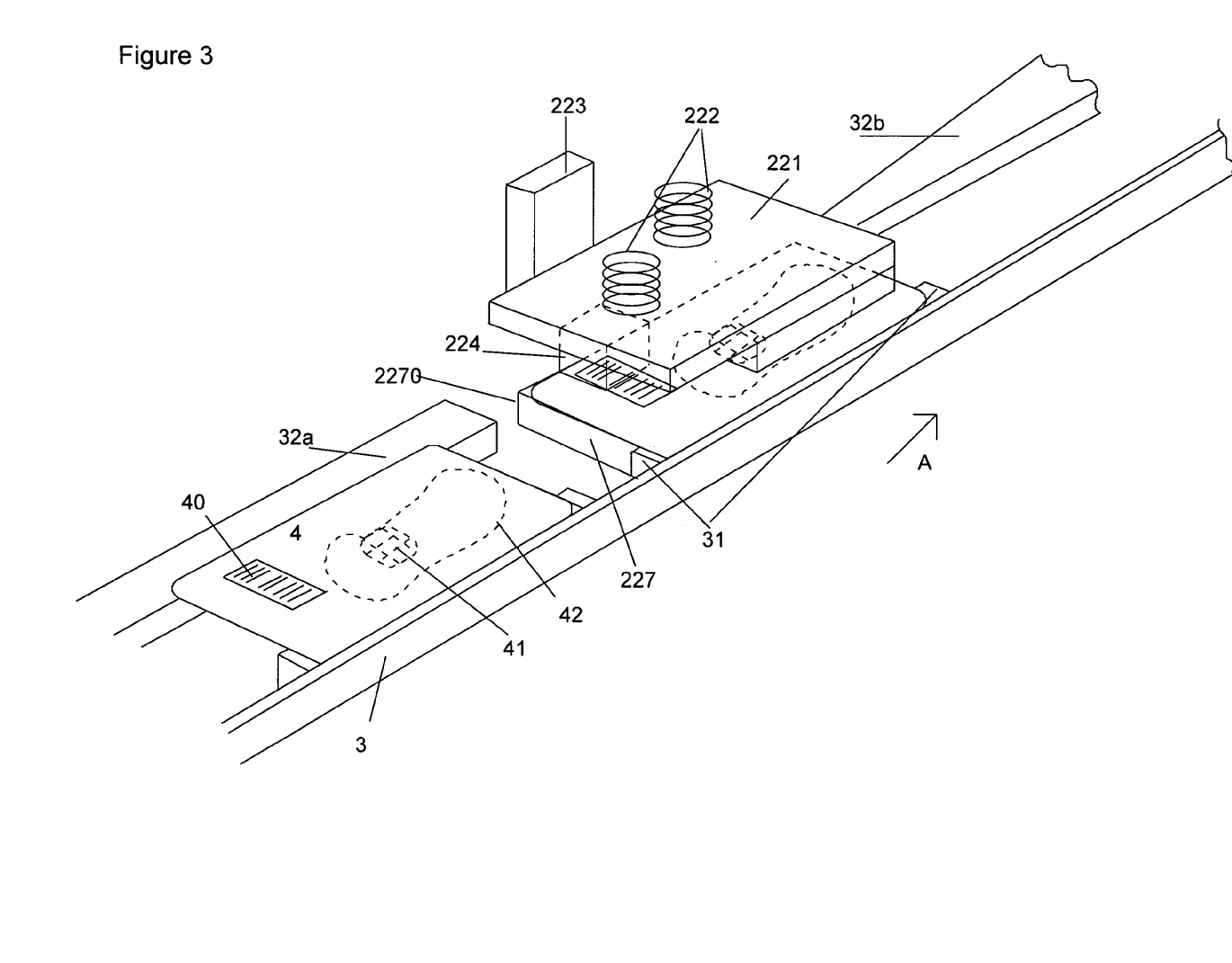
FIG. 3 shows a perspective view of the insertion station placing portable items in the personalization plate according to one embodiment of the present invention.

According to a first embodiment, the invention consists of a table 1 mounted on legs 10, on the top of a which transport means are arranged such as a transfer path consisting of a continuous toothed belt 3 circulating between two end pulleys 33, 34 of which one is driven by a motor 30. On this endless belt 3, grasping means 31 are mounted in pairs at regular intervals, such as tappets or grippers enabling the passport to be held in horizontal position when being conveyed. The distance between two consecutive grasping means 31 corresponds to the length of a passport 4. Each pair of grasping means 31 distanced by the length of a passport lies adjacent to the following pair over a shorter length. The grasping means 31 are used to hold the passports 4 when being conveyed over the incoming part of the path represented by the arrow (A) in FIG. 3, and to convey them from one station to another. For more details on grasping means 31 according to one embodiment using tappets and on the transfer device, reference may be made to European patent application 0 589 771 by the same registrant. Grippers 31 according to the second embodiment of grasping means 31 comprise an opening and closing system that is mechanically or computer controlled enabling the pages of passport 4 to be held when document 4 is being conveyed along the transfer path. These grippers prevent the pages from being unduly bent. The control of the opening and closing of the grippers may be made at the time the documents 4 are distributed on the transfer path, when documents 4 are loaded from and unloaded onto the personalization station and/or when the documents are evacuated or stored at the end of personalization. According to one variant of the passport holding embodiment, the passports may be conveyed in vertical position by the grasping means of the transfer path. In this case, the distance between two consecutive grasping means corresponds either to the length of the documents or to the width of the documents depending upon the vertical position used. The transfer path is completed, as can be seen in FIG. 3, by bearer rails 32a, 32b which are discontinued at the loading/unloading station to allow passing of the personalization devices 22i interdependent with a personalization station 20 as will be seen below.

Figure 2A:
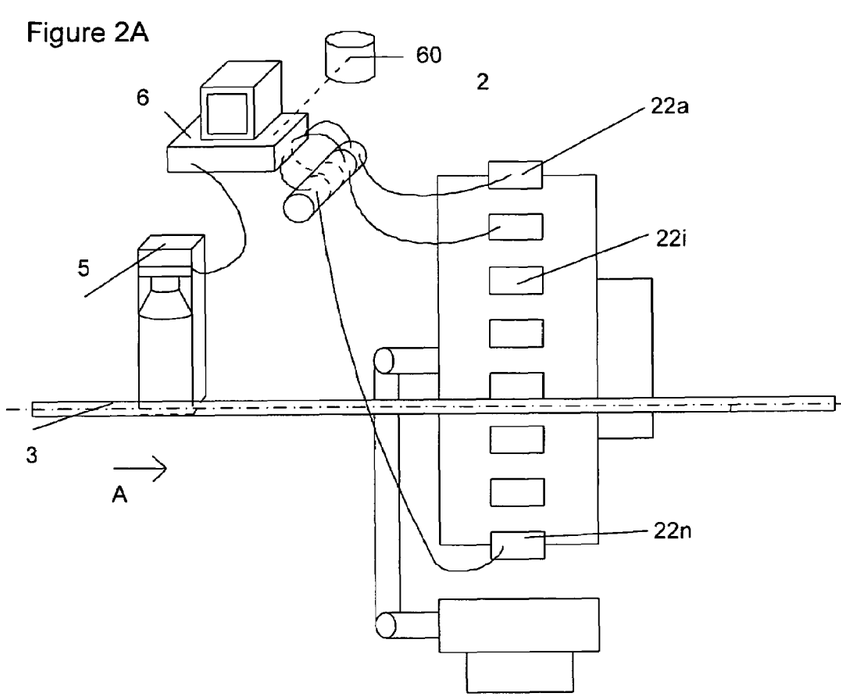
FIG. 2A shows front elevation view of a part of the personalization machine and of the personalization station according to a first embodiment of the present invention.

With reference to FIGS. 1 and 2A, the table comprises an unstacking device 11 which, from a batch of passports, distributes passports 4 and inserts them one by one between each pair of grasping means 31. In the passport transfer mode in horizontal position on the transfer path (shown FIG. 1), the unstacking device comprises a vertical magazine in which the passports are stacked. In the passport transfer mode in vertical position on the transfer path (not shown) the unstacking device comprises a horizontal magazine in which the passports are placed side by side. Also the unstacking device 11 may comprise a double input magazine enabling the uninterrupted supply of the machine, the changeover of magazines being conducted during masked time. Each magazine is removable having a content for example of 500 passports. The passports 4 inserted in the transfer path are brought face to the passport identifier reading device called the reading station 5 in the remainder of the description. This reading station 5 enables the reading and decoding of the identifier written on the label 40 of passports 4. In one embodiment in which the passport label is magnetic, the reading station is a magnetic reader. In an embodiment in which the label comprises a bar code or punches or a code with OCR or OCV characters, the reading station comprises an optical camera to decode the label markings. In an embodiment in which the writing of OCR or OCV character type are written into one of the pages of the document, the reading station comprises a device enabling the passport pages to be turned automatically and held them open at the desired page during reading. Generally, the reading station is connected to a computer system 6 comprising a database 60. The computer system 6 performs the link between reading of the identifier, the search for personalization data corresponding to this identifier in the database, and the recording of data into the memory of the electronic chip associated with the identifier. For this purpose, the computer system 6 conducts a personalization process explained in the remainder of the description. After reading the identifier 40 of passports 4, the passports 4 are transferred from the reading station 5 to the personalization station 2. The transfer between the two stations may be made in securitized manner so that the passport 4 cannot be substituted before personalization of the electronic chips 41. A minimum transfer pitch on the transfer path 3 is preferable to minimize the time lapse between reading of the identifier 40 and writing of the information in the electronic chip 41 of passport 4. To securitize the system, the embodiment of the grasping means 31 with grippers is preferred to prevent any fraud, the passports 4 being held by the grippers during the transfer from the reading station 5 to the personalization station 2. The personalization station 2, according to an embodiment shown FIG. 2A, comprises a revolving plate or drum 20 whose rotation axis is horizontal and perpendicular to the platform of table 1. The revolving plate bears relative to the transfer path so that the plate 20 faces the transfer path in the direction shown by arrow A. This revolving plate 20 carries on its periphery a plurality of personalization devices 22i, 22n so that each personalization device 22i, 22n may insert itself in the pathway of the passports between guide rail 32a for arriving passports and guide rail 32b for outgoing passports leaving the personalization system formed by revolving plate 20. According to a transfer mode of the passports in horizontal position (shown FIG. 3), the personalization devices present themselves parallel to the transfer path.

According to a passport transfer mode in vertical position (not shown) the personalization devices present themselves perpendicular to the transfer path. In all cases, the personalization devices 22i are of slightly smaller size than the passports 4 and have a space between their outer edge and the toothed belt 3. A jack device for example can be used to correctly position each passport once it has been brought between the two elements of the personalization device 22i bearing upon reference surfaces 2270 of the fixed part 227 of the personalization device. Each personalization device 22i for one passport 4 comprises a fixed plate 227 interdependent with revolving plate 20, and a guide column 223 interdependent with plate 20 to guide a mobile element 221 supporting a head 224. As shown FIG. 4A, each head 224 is in non-conductor material, such as a plastic material, and comprises a contactless communication means such as a transmitting and receiving antenna 225 electrically connected to a connector 2241 which ensures the connection between a layer of wires 217 connected by another connector 216 to an electronic card 21i for personalization and management of head 224. Each personalization device 22i is connected to a personalization card 21i arranged in a rack integral with the revolving plate 20, a single personalization card possibly being connected to several personalization devices. The contactless communication means 225' with transmitting and receiving antenna, according to a variant of embodiment shown FIG. 4B, may be moulded in the fixed plate 227 electrically connected to a connector 2241' which ensures the connection with a layer of wires 217' connected via another connector 216' to the electronic personalization card. A personalization card 21i comprises an antenna interface circuit 211' or 211 arranged between the bus 210 of the card and the connector 216 or 216' connected to the communication means 225, 225'. This antenna interface circuit 211' or 211 may be of the type commercially available from Philips under reference MFCM 200. The bus 210 is also connected to a microprocessor 212 of the personalization card which executes the personalization programme of the electronic chips, said programme being loaded into a memory 213 of electronic card 21i. A single electronic card may manage the personalization of several passports at the same time. The power of present-day microprocessors makes it possible for example to consider dialogue with four passports simultaneously, without penalizing performance level, using only one electronic card. The future will no doubt bring much greater performance with a minimum of only one electronic card for all passports. The microprocessor 212 may manage the personalization of several passports inserted in the personalization devices 22i connected to the electronic card 21i associated with microprocessor 212. The memory 213 may optionally be integrated in the processor 212 or, as shown FIGS. 4A, 4B and 4C, may be connected to it by the bus 210. The memory also comprises a free space to store personalization data of the passport to be personalized. Finally, the microprocessor 212, via bus 210 and connector 214 connected to this bus 210, also has a security card whose function is to provide security information necessary for personalizing security applications. Finally, bus 210 of each card is connected by an interface 215 of UART type to a backpanel computer 61. During the personalization phase, the passport is held pressed between the fixed part 227 and the head 224 interdependent with the mobile part 221 of the personalization device. The mobile part 221 of the personalization device 22i with one passport is under permanent prompting in direction of the fixed part 227 via elastic means 222 bearing upon a fixed part of the plate 20. An L-shaped lever 228, via its end part 2281, is used to act upon the guide 2210 interdependent with the head 224 and mobile part 221 to provide sufficient space between head 224 and fixed part 227 to allow passing of the passports 4 conveyed by the transfer path and the toothed belt 3 and thereby to ensure the loading and unloading of passports 4. With reference to FIG. 5, showing a passport transfer mode in horizontal position, the lever 228 is actuated to lift the head 224 by a finger 229 interdependent with the revolving plate 20 arranged opposite each lever 228 associated with each personalization device 22i. When a personalization device 22i comes to position itself at the loading and unloading station of passports 4, by inserting itself in the transfer path 3 between the incoming guides 32a and outgoing guides 32b, the finger actuating lever 228 is positioned opposite a jack (or other actuator) 230 whose piston 231 lifts up the heads. This allows release of the passport 4, then a movement of belt 3 in the direction shown by arrow A FIG. 3 causes the personalized passport 4 to be moved forward and at the same time brings the following passport into the personalization device 22i which has just finished personalization. In the passport transfer mode in vertical position (not shown) the lever may be arranged so that it enables head 224 to be moved away from the fixed part 227. In all cases, the personalized passport or one leaving the plate is transported by belt 3 towards an ejection station 12. This ejection station 12 can be used to redirect the passports 4, for which personalization of the electronic chip 41 is incomplete or faulty, towards a trap. Faulty electronic chips 41 of passports 4 redirected in this manner are replaced by new chips 41 not containing any personalization data, and the passports 4 are then again placed in the unstacking device 11. If personalization is successful, passport 4 is transferred towards a conventional stacking device 13 where it is stacked in a double magazine functioning along the same principle as the unstacking device 11 but in reverse direction.

The revolving plate 20 may therefore comprise a large number of personalization devices 22i associated with one electronic personalization card 21i. Each electronic card 21i manages the personalization of the electronic chip 41 of passport 4 inserted by transfer belt 3 in the personalization device 22i connected to the personalization card 21i. The plate may therefore comprise 32, 24, 16, 12 or 6 personalization devices 22i for example, connected to electronic personalization cards 21i, each of the electronic personalization cards being network connected to computer 6 dedicated to personalization. The link between the rotating onboard system 2 and fixed installation 6 may be ensured by a rotating collector 62. The connection is made by fixed contacts interdependent with the fixed part of the machine bearing upon an assembly of rotating tracks interdependent with the revolving plate. Similarly the power supplies, necessary for the functioning of the equipment onboard the revolving plate are made via fixed contacts bearing upon the supply tracks. The revolving plate may perform a rotation in continuous manner and at each rotation pitch present a personalization device so that it faces the transfer path. According to a more economical variant of embodiment, the link between the rotating onboard system and the fixed installation may be ensured by a flexible connector such as coiled conductor layer. One end of the conductor layer is connected to the fixed installation, the other end is connected to the rotating axis of the revolving plate. In this embodiment, the revolving plate carries out alternate rotation, first in one direction then in the other. In this case the personalization devices may arrive in intercalation to optimise personalization of passports. For example, in one direction one out of every two personalization devices may stop at the loading and unloading station of the personalization station, and in the other direction it is the complementary devices that stop.

Figure 7A:
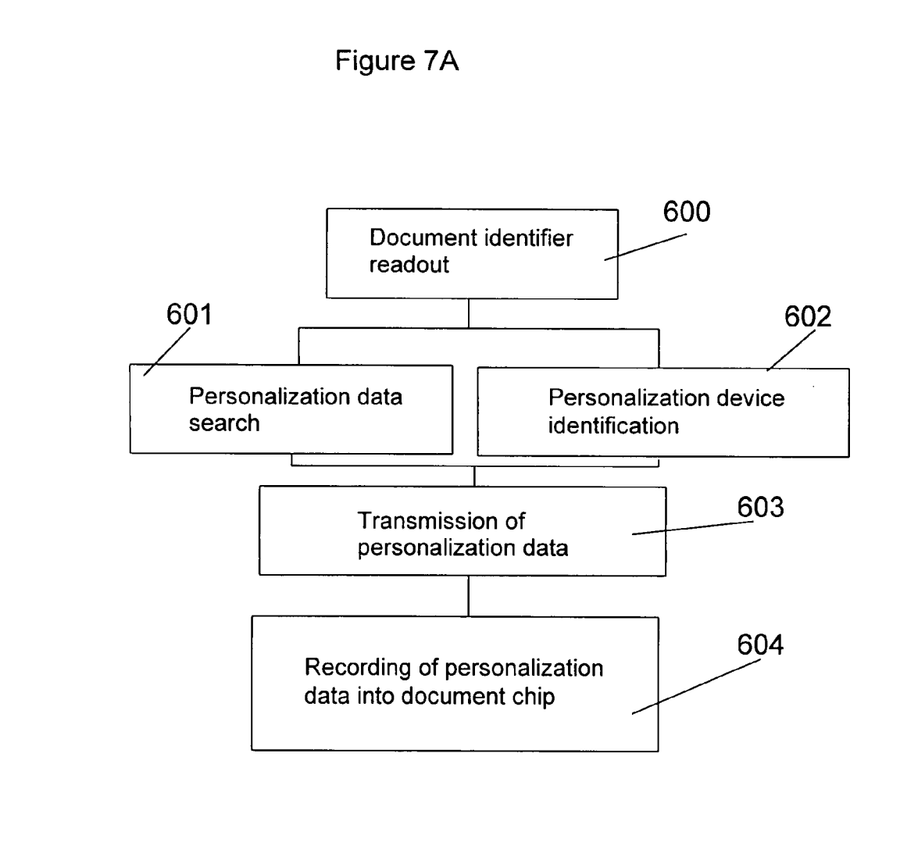
FIGS. 7A and 7B show a logic schematic of the personalization process according to the two embodiments of FIG. 4A or 4B and 4C.

The computer system 6 connected to the personalization station comprises the management software for personalization of the electronic chips 41 of passports 4. This computer 6 is also connected to the reading station 5 to recover the identifier read on the label 40 of a passport 4 before personalization, or the identifier written into one of the inside pages of the passport. FIG. 7A shows the personalization process according to an embodiment conducted by the computer system 6. A first step 600 consists of reading the identifier 41 of document 4 via the optical or magnetic reading device 5 arranged before the personalization station and of transferring this information to the computer system. A second step 601 consists of searching the personalization data related to said identifier in the database of the computer system, the computer system comprising a means for extracting data from the database and for communicating them to an electronic card 21i. A third step 602 concomitant with step two 601 consists of identifying the personalization device 22i arriving at the loading/unloading station which will load and personalize the document whose identifier has just been read. The identification may be associated with an address corresponding to each personalization device 22i. A fourth step 603 consists of transmitting the personalization data from the database to the memory of the electronic card connected to the identified personalization device. A fifth step 604, once the document is loaded in personalization device 22i, consists of recording the personalization data memorized in the electronic card's memory into the memory of the electronic chip 41 of loaded document 4 via contactless communication means 2243, 42 of personalization device 22i and document 4 respectively. The electronic card's processor will command writing of the data memorized in the card memory into the memory of the electronic chip. One card may be connected to several personalization devices, the card's processor, in this case, will manage the distribution of data towards the proper personalization device in which the passport to be personalized is to be inserted.

Finally another PC 61 or the computer system itself manages the sequential commanding of the machine and receives data from the various positioning devices such as the angular position encoder of plate 20, the various detection devices to ensure that a passport conveyed by belt 3 is positioned facing the proper station, and to detect the position of connection 3. In the embodiment of grasping means 31 which comprises grippers, the opening and closing may be automatically controlled by PC 61. The rotation axis of plate 20 is driven by a synchronous motor via toothed belt transmission. The positions of the personalization devices 22i may be tracked by a coding system not shown.

When in operation, the belt transfer device 3 takes a passport 4 from a personalization device 22i arriving at the loading/unloading station whose personalization has been completed and places a new passport 4 in the personalization device 22i whose position has just been cleared. After inserting the passport, a continuous rotation of a position or an alternate rotation of the revolving plate 20 is conducted. The personalization lasts a time period which may correspond to no more than the duration of rotation over a complete turn. After a sufficient fraction number of turns of plate 20, the personalized passport 4 re-inserts itself in the transfer path between two free grasping means 31. Then passport 4 is extracted from personalization device 22i by movement of the transfer belt 3 after lifting away head 25 and presser 221. When plate 2 comprises an assembly of 32 personalization devices and with a travel speed from one station to the next in the order of one passport per second, the machine can achieve a personalization capacity of 3600 passports per hour with a maximum personalization time in the order of 32 seconds.

Figure 4A:
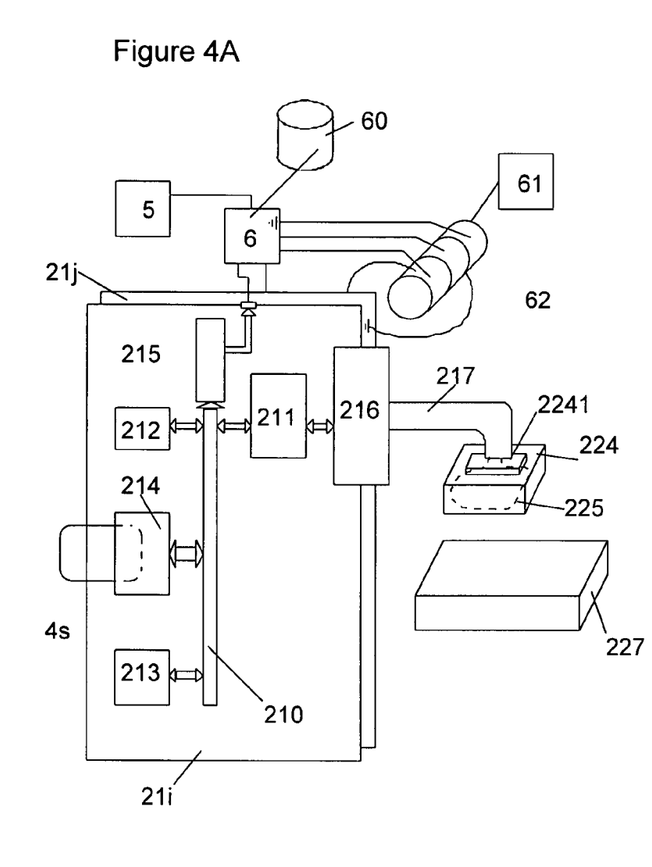
FIGS. 4A and 4B show the diagram of the electronic circuit card of personalization devices necessary for contactless personalization of a document according to two embodiments respectively.
Figure 4B:
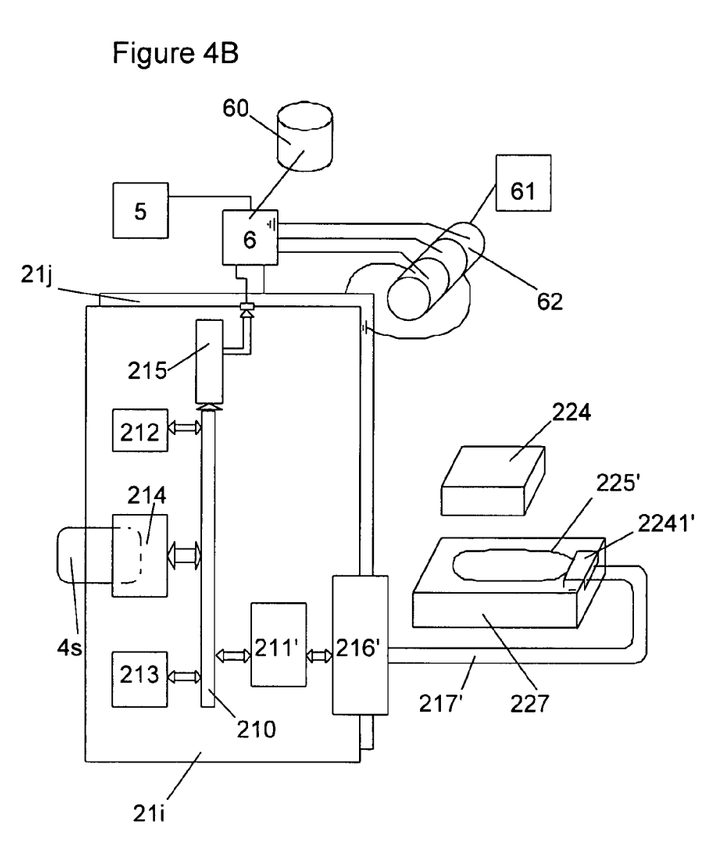
Figure 4C:
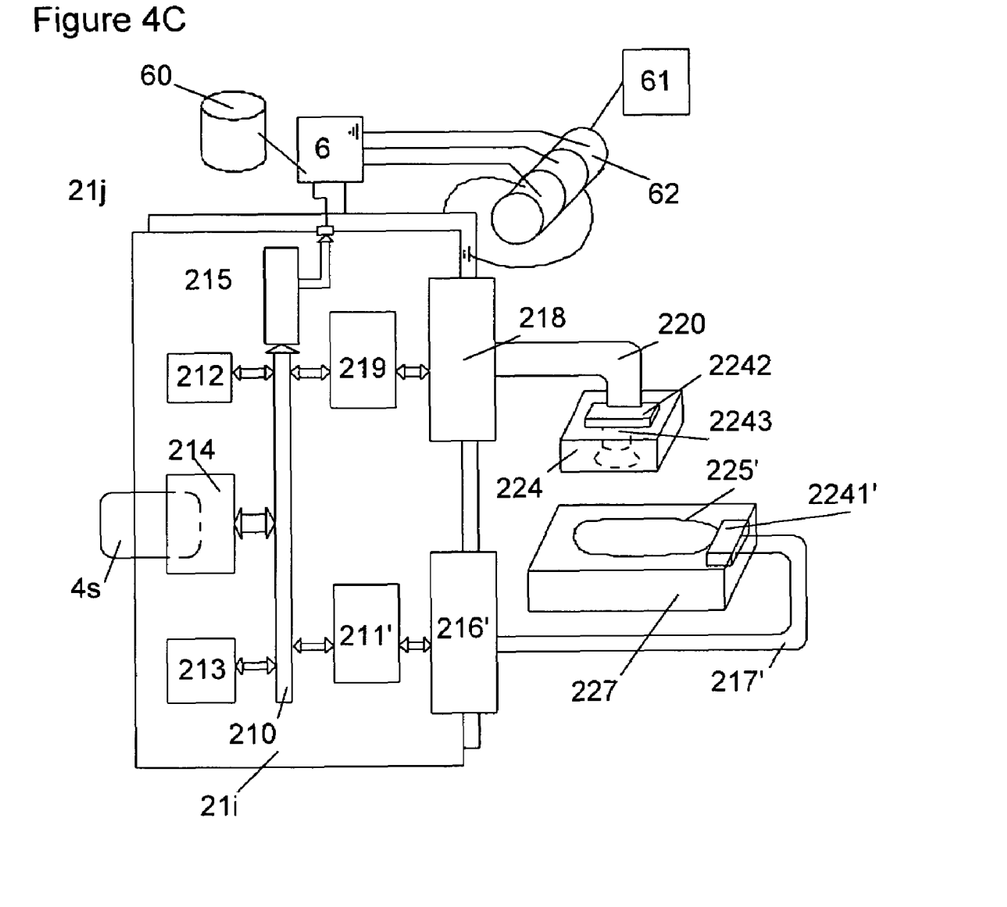
FIG. 4C shows the diagram of the electronic circuit card of the personalization devices necessary for contactless personalization of a document according to a third embodiment.
Figure 7B:
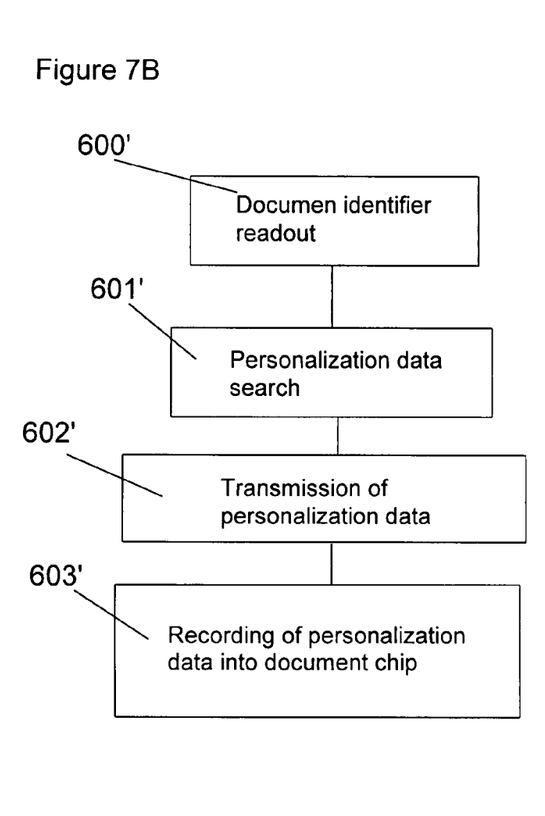

In a second embodiment of the personalization machine shown FIG. 4C, each personalization device may comprise an optical or magnetic reading element 2243. This element may be for example positioned on the head 224 arranged facing label 40 of passport 4 and electronically connected to a connector 2242 which ensures connection with a wire layer 220 connected by a connector 218 to an electronic card 21i associated with personalization device 22i. The electronic card 21i then comprises a reading interface 219 located between the connector 218 and the bus 210. In this embodiment, the fixed plate 227 comprises contactless communication means 225' such as a transmitting/receiving antenna moulded in the plate 227, the communication means 225' being electrically connected to a connector 2241' which ensures connection with a wire layer 217', connected by a second connector 216' of the same electronic card 21i. An interface of communication means 211' is arranged between connector 216' associated with the communication means and the bus 210 of electronic card 21i. The FIG. 7B shows the personalization process according to this embodiment, performed by the computer system 6. A first step 600' consists of reading the identifier 41 of the document 4 by optical or magnetic or electromagnetic reading device 2243 arranged in each personalization device 22i and of transferring this information towards the computer system 6 via an interface 215 and a connector 62. A second step 601' searches the personalization data related to the read identifier, in the database of the computer system, the computer system comprising a means for extracting data from the database and communicating them towards an electronic card 21i. A third step 602' consists of transmitting the personalization data from the database to the memory of the electronic card connected to the personalization device containing the document to be personalized. A fourth step 603' consists of recording the personalization data memorized in the memory of the electronic card into the memory of the electronic chip 41 of loaded document 4 via contactless communication means 225', 42 of the personalization device 22i and the document 4 respectively. The processor of the electronic card commands writing of the data memorized in the memory of the card into the memory of the electronic chip. The personalization programme of electronic card 21i contains instructions, in its algorithm, needed to provide access, via the bus 210, to the connector 219 which corresponds to the reading element, to carry out reading and redirect the identification number read on identifier 40 of a passport 4 to the memory 213 of the personalization card 21i. Followed by instructions required for recovering, in the database of personalization management computer 421 which manages the personalization, the relative data associated with the read identification number for their memorization in the memory 213 of electronic card 21i. Finally, instructions provide access via bus 210 to connector 216' which corresponds to antenna 225' of fixed plate 227, and write the memorized data in the electronic chip 41 of the passport 4. Therefore the personalization programme will comprise means for selectively addressing and selectively commanding the addressing of information towards either one of connectors 216', 218.

In a third embodiment, the personalization machine comprises a reading device 5' to read an identifier pre-memorized in the memory of the electronic chip 41 integrated in the passport 4. The identifier is also called pre-personalization data such as the serial number of the electronic chip. The reading station 5' to read the identifier of the chip 41 replaces the optical or magnetic reading station 5 reading the identification number of the label 40 of the passport 4. The reading station 5' of the chip 41 comprises a contactless communication system such as a transmitting receiving antenna enabling hertz wave communication with antenna 42 of the electronic chip 41 of the passport 4. This reading station 5' is connected to the computer system 6 managing the personalization of the electronic chips of passports 4. The personalization process of this variant of embodiment is close to the personalization process of the personalization machine comprising an optical or magnetic reading station separate from the personalization station shown FIG. 7A. A first step 600 consists of reading the pre-memorized identifier of the electronic chip 41 of the document 4 by the reading device 5' arranged before the personalization station and of transferring this information to the computer system. A second step 601 searches personalization data related to the read pre-memorized identifier in the database of the computer system, the computer system comprising means for extracting the data from the database and communicating them towards an electronic card 21i. A third step 602 concomitant with step two 601 consists of identifying the personalization device 22i arriving at the loading/unloading station which will load and personalize the document whose pre-memorized identifier has just been read. Identification may be associated with an address corresponding to each personalization device 22i. A fourth step 603 consists of transmitting the personalization data from the database towards the memory of the electronic card connected to the identified personalization device. A fifth step 604, once the document is loaded in personalization device 22i, consists of recording the personalization data memorized in the memory of the electronic card into the memory of the electronic chip 41 of the loaded document 4 via contactless communication means 225 or 225', 42 of the personalization device 22i and the document 4 respectively. The electronic card's processor commands writing of data memorized in the card's memory into the memory of the electronic chip. A verification by the electronic card of the proper identifier of the electronic chip to be personalized may be performed before writing to avoid any recording errors.

A fourth embodiment may be considered, consisting of inserting the reading of the pre-memorized identifier of the electronic chip directly using contactless communication means 225, 225' connected to a personalization card 21i. This embodiment avoids any data writing error in the memory of the electronic chip integrated in the passport and also allows increased the rapidity in personalizing passport chips, thereby eliminating the need to pass through a reading station before personalization.

Any modification within the reach of persons skilled in the art also comes within the spirit of the invention. The fact that each personalization card 21i is onboard revolving plate 20 means that it is possible to personalize passports 4 at a much faster rate by shortening transmission times between the personalization equipment and the passports 4 to be personalized. Similarly, the transmitting of personalization parameters and the fact that each card 21i has an onboard personalization programme also improves the machine's yield. Finally the use on each personalization card 21i of a specific connector 214, to enable the positioning of a security card 4s delivering security information needed for security personalization operations, improves the reliability and security of personalization operations.

Figure 2B:
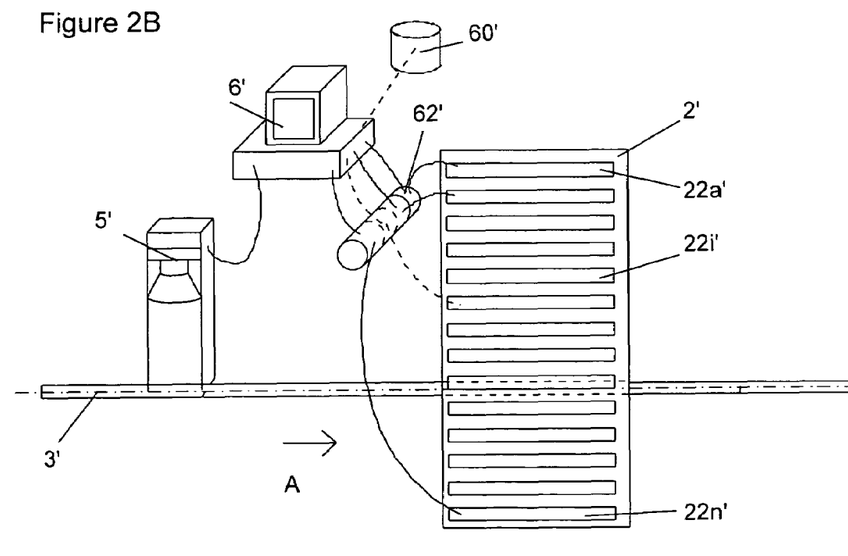
FIG. 2B shows a front elevation view of a part of the personalization machine and of the personalization station according to a second embodiment of the present invention.

One variant of embodiment, shown FIG. 2B of the personalization station consists of a personalization station which is an elevator comprising a plurality of personalization devices 22a–22n. In a passport transfer mode in horizontal position, the translation axis of the elevator is vertical and perpendicular to the platform of the table 1 so that the personalization devices 22a–22n are presented perpendicular to the transfer path oriented in direction of arrow A, and each personalization device 22a–22n is able to insert itself in the line of passports between guide rail 32a for incoming passports and guide rail 32b for passports leaving the personalization system. In a passport transfer mode in vertical position, the translation axis of the elevator is horizontal and parallel to the platform of the table 1 so that the personalization devices 22a–22n are presented parallel to the transfer path oriented along the direction of arrow A and each personalization device 22a–22n is able to insert itself in the passport line between guide rail 32a for incoming passports and guide rail 32b for passports leaving the personalization system. In both these embodiments, the personalization devices 22a–22n are identical to the personalization devices of the embodiment comprising a revolving plate. Personalization devices 22a–22n are positioned linear and juxtaposed fashion in the elevator. The elevator also comprises a loading/unloading station for documents to be personalized or already personalized. When in operation, the belt transfer device 3 extracts a passport 4 from a personalization device 22i' arriving at the loading/unloading station whose document personalization has been completed and inserts a new passport 4 in the personalization device 22i whose position has just been cleared. After inserting the passport, the elevator moves either vertically or horizontally by one pitch to unload and then load a new passport. When it arrives at the end of its translation the elevator will perform a complete reverse translation to position its personalization device facing the transfer path. The personalization lasts a minimum time which may correspond to the entire duration of translation in one direction so that it can return to the initial personalization device. In a variant of embodiment the travel cycle of the elevator may be sequential. For example, the elevator may move to one out of every two positions in one pitch in one direction of translation and then return in reverse direction to the complementary positions. In all cases, after a sufficient fraction number of movements of elevator 20 the personalized passport 4 is replaced in the transfer path between two free grasping means 31. Then passport 4 is removed from the personalization device 22i by movement of the transfer belt 3 after lifting head 25 and presser 221. The different variants of personalization processes are identical to the variants of personalization processes when the personalization station comprises a revolving plate 2.

Another variant of embodiment (not shown) consists of a personalization station with a revolving plate whose rotation axis is both horizontal and parallel to the table platform and is also inclined relative to the transfer path. This revolving plate has a truncated conical section of which one side of the frustum, on account of the incline of the plate's rotation axis, is parallel to the transfer path. The lateral inclined face of the frustum carries on its periphery a plurality of personalization devices so that each personalization device may insert itself in the path of cards between the guide rail for incoming cards and the guide rail for outgoing cards leaving the personalization system.

According to a further embodiment (not shown) of the personalization machine, the insertion of passports on the transport means may be made manually.

According to a further embodiment (not shown) of the personalization machine, the identifier reading device and the personalization device may be integrated in a passport fabrication and/or pre-personalization machine. A passport pre-personalization machine inserts text data, photo and/or punches corresponding to the future passport holder. The computer system connected to the reading device and to the personalization device may also be connected to the passport fabrication and/or pre-personalization and printing station (photo, punching, text) thereby managing the follow-up of print data to be entered into the passport and of personalization data to be memorized in the electronic chip inserted in the passport.

It will be obvious to persons skilled in the art that the present invention allows embodiments under numerous other specific forms without departing from the scope of application of the invention as claimed. Therefore the present embodiments must be considered as illustrative but can be modified within the area defined by the scope of the appended claims, and the invention must not therefore be limited to the afore-described details.

What is claimed is:

1. A personalization machine comprising:
    a personalization station for personalizing a multi-page personalizable document marked with an identifier representing identification information and containing an electronic chip and a contactless communication device with a transmitting/receiving antenna connected to the electronic chip
    a reading device to read the identifier of the document, the reading device comprising a page turning device to turn the pages of the document opened at the page where the identifier is marked, a transfer device assuring a secured transfer of the identified document held open by a holding device, from the reading device to the personalization station,
    this identifier being associated with personalization data memorized in a database of a computer system, at least some of this personalization data to being recorded by the personalization station into the electronic chip of the identified document.

2. A personalization machine according to claim 1, wherein the electronic chip comprises an integrated circuit containing at least one memory.

3. A personalization machine according to claim 2, wherein the personalization station comprises a plurality of personalization devices in which personalization documents are loaded, and at least one or more electronic cards are connected to at least one personalization device comprising a fixed plate on which the document is held and a contactless communication device comprising a transmitting/receiving antenna to communicate with the contactless communication device of the document, the antenna being associated with an electronic card transmitting personalization for each document, the electronic card being in communication with a computer system which manages the personalization data.

4. A personalization machine according to claim 3, wherein the holding of the document in the personalization device is ensured by pinching the document between the fixed plate and a head.

5. A personalization machine according to claim 4, wherein the contactless communication device is arranged in the head.

6. A personalization machine according to claim 3, wherein the electronic card comprises an interface circuit with at least one contactless communication device, the interface circuit being connected via a bus to a microprocessor which executes a personalization program.

7. A personalization machine according to claim 6, wherein a bus of the electronic card is network connected via an interface which is connected by a connector to the computer system, the computer system comprising a follow-up means to track the position of electronic cards connected to personalization devices and for addressing the electronic cards corresponding to the personalization device arriving at the loading position or which has just left the loading position.

8. A personalization machine according to claim 7, wherein the electronic card comprises a connector connected to a contactless communication device of the personalization device, and wherein the reading device reads a pre-memorized identifier in memory of the electronic chip by use of the contactless communication device associated with a microprocessor of an electronic card comprising the personalizable document.

9. A personalization machine according to claim 4, wherein the contactless communication device is arranged in the fixed plate.

10. A personalization machine according to claim 3, wherein the personalization station includes a revolving plate comprising a plurality of personalization devices presented in loading position, transversely and sequentially to a transfer path of a transfer device, and wherein the revolving plate comprises a loading/unloading device allowing a personalized document to be unloaded from a personalization device positioned on the loading/unloading device onto the document transfer device and a new document to be loaded from the transfer device towards the personalization device, the maximum personalization time corresponding to one turn of the revolving plate.

11. A personalization machine according to claim 3, wherein the personalization station includes an elevator comprising a plurality of personalization devices arranged in linear and juxtaposed fashion in the elevator and wherein the elevator comprises a loading/unloading device allowing a personalized document to be unloaded from a personalization device positioned on the loading/unloading device onto a transfer device for documents and a new document to be loaded from the transfer device towards the personalization device, the maximum personalization time corresponding to a complete translation cycle of the elevator.

12. A personalization machine according to claim 11, wherein an axis of the elevator is arranged perpendicular to and facing the transfer path of the transfer device, the movement of the elevator being made by vertical translation.

13. A personalization machine according to claim 11, wherein an axis of elevator is arranged parallel to and facing the transfer path of the transfer device, the movement of the elevator being made by horizontal translation.

14. A personalization machine according to claim 1, wherein the identifier of the document is a printed data item of bar code, punched or magnetic type or a sequence of OCR or OCV characters.

15. A personalization machine according to claim 1, wherein the identifier of the document is a data item pre-memorized in the electronic chip of the document.

16. A personalization machine according to claim 15, wherein the identifier is a serial number of the electronic chip.

17. A personalization machine according to claim 1, wherein the document is a passport document, the electronic chip and the communication device being incorporated together either in a document cover or between the two pages of the document joined side-by-side or on the surface of a page.

18. A personalization machine according to claim 1, wherein the document is a passport document, the identifier being marked on an outside or inside surface of a document cover or on a page of the document.

19. A personalization machine according to claim 1, wherein a computer system is connected to the reading device reading the identifier of the document, the reading device comprising transmission device for transmitting the identifier towards the computer system, the computer system comprising means for extracting personalization data associated with the identifier from the database and communicating these personalization data to an electronic card associated with the personalization device in which the document is to be inserted, and for sending this data from the electronic card, the electronic card comprising means for transmitting the received personalization data towards a memory of the electronic chip.

20. A personalization machine according to claim 1, wherein the reading device is a reading device with optical character recognition enabling the reading of a visible printed identifier of the document and transmitting optically recognized information to the computer system which uses this information to search personalization data in the database of the computer system.

21. A personalization machine as in claim 20, wherein an optical or magnetic reading device is arranged in the head of each personalization device so that said reading device is positioned facing a visible identifier of the document which is loaded in a personalization device.

22. A personalization machine according to claim 1, wherein the reading device is a magnetic or electromagnetic reading device allowing reading of the magnetic identifier of the document and transmitting magnetically or electromagnetically recognized information to the computer system which uses this information to search personalization data in the database of the computer system.

23. A personalization machine according to claim 1, wherein the reading device is a printed integrated circuit reading device comprising a contactless communication device allowing reading of an identifier that is pre-memorized in the memory of the electronic chip of the document, and transmitting a read number to the computer system which uses this number to search for personalization data in the database of the computer system.

24. A personalization machine according to claim 1, further comprising sequence command and personalization management means.

25. A personalization machine according to claim 1, further comprising a transfer device for personalizable documents, which comprises a transfer path on which grasping devices for documents are mounted, the grasping devices being mounted at regular intervals in pairs, the maximum distance between two consecutive grasping devices allowing the holding of a document.

26. A personalization machine according to claim 1, further comprising a document unstacking device at the output of the machine for incoming documents and a document stacking device at the output of the machine.

27. A personalization machine according to claim 1, wherein said computer system manages a passport fabrication machine and/or a pre-personalization machine which incorporates said personalization machine.

28. A personalization process performed by a personalization machine comprising a personalizing device for a personalizable document and a computer system including a database, the personalizable document comprising an identifier, an electronic chip and a contactless communication device, the identifier being marked on the document, the personalization process being comprising:
  (a) loading the document and controlling a holding device to hold the document open at a selected page
  (b) reading the document identifier with a reading device and transmitting the read information to the computer system,
  (c) searching personalization data in a database of the computer system related to an identifier of the document during a secured transfer of the document from the reading device to the personalizing device,
  (d) transmitting and recording the personalization data into a memory of the electronic chip, with optional recording of the identifier into a chip memory.

29. A personalization process according to claim 28, characterized in that the third step is made by wherein step (d) comprises loading personalization data relative to the document identifier into a memory of the electronic card associated with the personalizing device, and step then communicating this personalization data to the electronic chip of the document via a contactless communication device to record this personalization data into the memory of the electronic chip.

30. A personalization process according to claim 28, wherein step (b) comprises turning document pages to a selected page.

31. A personalization machine comprising:
  a personalization station for personalizable documents and computer system,
  wherein each personalizable document comprises an identifier representing identification information, an electronic chip and a contactless communication device comprising a transmitting/receiving antenna connected to the electronic chip, the electronic chip and the communication device being incorporated in the document, a reading device to read the identifier of the document, this identifier being associated with personalization data memorized in a database of the computer system, the personalization station including a plurality of personalization devices in which the personalization documents are loaded, and one or more electronic cards connected to one or more personalization devices, a personalization device comprising a fixed plate on which the document is held and a contactless communication device comprising a transmitting/receiving antenna to communicate with the contactless communication device of the document, the antenna being associated with one of said electronic cards transmitting the personalization data for each document, the electronic card being in communication with the computer system which manages the personalization data at least some of this personalization data being recorded by the personalization station into the electronic chip of the identified document.

32. A personalization machine comprising:

a personalization station for personalizable documents and a computer system, wherein each personalizable document comprises an identifier representing identification information, an electronic chip and a contactless communication device connected to the electronic chip, the electronic chip and the communication device being incorporated in the document, a reading device to read the identifier of the document, this identifier being associated with personalization data memorized in a database of the computer system, the reading device comprising a transmission device to transmit the identifier towards the computer system, the computer system comprising means for extracting personalization data associated with the identifier from the database and communicating these personalization data to an electronic card associated with a personalization device in which the document is to be inserted, and for sending this data from the electronic card, the electronic card comprising means for transmitting the received personalization data towards a memory of the electronic chip to be recorded.

33. A personalization machine comprising:

a personalization station for personalizable documents and a computer system, wherein each personalizable document comprises plural pages, an identifier representing an identification information, an electronic chip and a contactless communication device with a transmitting/receiving antenna being connected to the electronic chip, the electronic chip and the communication device being incorporated in the document, sequence command and personalization management means, a reading device to read the identifier of the document, this identifier being associated with personalization data memorized in a database of the computer system, at least some of the personalization data being recorded by the personalization station into the electronic chip of the identified document.

34. A personalization machine comprising:

a personalization station for personalizable documents and a computer system, wherein a personalizable document comprises an identifier representing an identification information, and electronic chip and a contactless communication device connected to the electronic chip, the electronic chip and the communication device being incorporated in the document, wherein the personalization machine comprises a transfer device for personalizable documents, which comprises a transfer path on which grasping devices for documents are mounted, the grasping devices being mounted at regular intervals in pairs, the maximum distance between two consecutive grasping devices allowing holding of a document; and wherein the personalization machine comprises a reading device to read the identifier of the document, this identifier being associated with personalization data memorized in a database of the computer system, at least some of this personalization data being recorded by the personalization station into the electronic chip of the identified document.

35. A personalization process performed by a personalization machine comprising a personalizing device for a personalizable document and a computer system including a database, the personalizable document comprising an identifier, and electronic chip and a contactless communication device, said personalization device comprising:

(a) reading the document identifier with a reading device and transmitting the read information to the computer system, (b) searching personalization data in a database of the computer system related to identifier of the document, (c) loading personalization data relative to the document identifier into a memory of an electronic card associated with the personalizing device for the document; and (d) communicating this personalization data to the electronic chip of a document via a contactless communication device to record this personalization data into memory of the electronic chip with optional recording of the identifier into the chip memory.

* * * * *